United States Patent
Hayashi

(10) Patent No.: US 9,463,716 B2
(45) Date of Patent: Oct. 11, 2016

(54) VEHICLE SLIDE RAIL DEVICE

(71) Applicant: SHIROKI CORPORATION, Kanagawa (JP)

(72) Inventor: Naoki Hayashi, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/394,310

(22) PCT Filed: Oct. 9, 2013

(86) PCT No.: PCT/JP2013/077456
§ 371 (c)(1),
(2) Date: Oct. 14, 2014

(87) PCT Pub. No.: WO2014/065119
PCT Pub. Date: May 1, 2014

(65) Prior Publication Data
US 2015/0069202 A1    Mar. 12, 2015

(30) Foreign Application Priority Data

Oct. 24, 2012 (JP) ................................ 2012-235101

(51) Int. Cl.
*B60N 2/07* (2006.01)
*B60N 2/08* (2006.01)
*B60N 2/06* (2006.01)

(52) U.S. Cl.
CPC ............... *B60N 2/0715* (2013.01); *B60N 2/06* (2013.01); *B60N 2/0705* (2013.01); *B60N 2/08* (2013.01);
(Continued)

(58) Field of Classification Search
CPC ........ B60N 2/08; B60N 2/12; B60N 2/0818; B60N 2/085; B60N 2/07; B60N 2/0722; B60N 2/0715; B60N 2/0705; B60N 2/0825
USPC .............. 297/65.13, 65.15, 344.11; 248/424, 248/425, 429, 430
See application file for complete search history.

(56) References Cited

U.S. PATENT DOCUMENTS 5,524,504 A * 6/1996 Brandoli et al. ................ 74/527
5,806,825 A * 9/1998 Couasnon ..................... 248/429
(Continued)

FOREIGN PATENT DOCUMENTS

| JP | 2012508132 A | 4/2012 |
| WO | 2010051903 A1 | 5/2010 |
| WO | 2012081339 A1 | 6/2012 |

OTHER PUBLICATIONS

International Search Report from PCT/JP2013/077456 dated Jan. 14, 2014.
(Continued)

*Primary Examiner* — Nkeisha Smith
(74) *Attorney, Agent, or Firm* — Millen, White, Zelano & Branigan, P.C.

(57) ABSTRACT

A vehicle slide rail device in which a rear portion of the front locking section and a front portion of the rear locking section each contact inner surfaces of corresponding lock grooves; and a forward/rearward distance between a front surface of the front locking section and a front surface of a corresponding said forward/rearward movement restriction groove, and a forward/rearward distance between a rear surface of the rear locking section and a rear surface of a corresponding said forward/rearward movement restriction groove, are narrower than a forward/rearward distance between a rear surface of the front locking section and a rear surface of a corresponding said forward/rearward movement restriction groove, and a forward/rearward distance between a front surface of the rear locking section and a front surface of a corresponding said forward/rearward movement restriction groove.

2 Claims, 11 Drawing Sheets

(52) U.S. Cl.
CPC .......... *B60N 2/0818* (2013.01); *B60N 2/0862* (2013.01); *B60N 2/0875* (2013.01); *B60N 2/0887* (2013.01)

(56) References Cited

U.S. PATENT DOCUMENTS

| | | | |
|---|---|---|---|
| 6,688,574 B2* | 2/2004 | Okazaki et al. | 248/424 |
| 7,314,204 B2* | 1/2008 | Kohmura | 248/430 |
| 7,641,164 B2* | 1/2010 | Nakamura | 248/424 |
| 7,658,429 B2* | 2/2010 | Koga et al. | 296/65.15 |
| 7,661,647 B2* | 2/2010 | Ito | 248/429 |
| 7,762,514 B2* | 7/2010 | Koga et al. | 248/429 |
| 8,038,197 B2* | 10/2011 | Koga | 296/65.18 |
| 8,469,327 B2* | 6/2013 | Hayashi | 248/429 |
| 8,469,328 B2* | 6/2013 | Nakamura et al. | 248/430 |
| 8,490,940 B2* | 7/2013 | Ito et al. | 248/429 |
| 8,523,263 B2* | 9/2013 | Kimura et al. | 296/65.13 |
| 8,616,515 B2* | 12/2013 | Hayashi | 248/429 |
| 8,646,742 B2* | 2/2014 | Hayashi et al. | 248/430 |
| 8,708,300 B2* | 4/2014 | Fujishiro et al. | 248/429 |
| 8,714,509 B2* | 5/2014 | Hayashi | 248/429 |
| 8,757,577 B2* | 6/2014 | Naoki | 248/429 |
| 8,770,534 B2* | 7/2014 | Nakamura et al. | 248/429 |
| 8,939,424 B2* | 1/2015 | Fukuda et al. | 248/429 |
| 9,016,655 B2* | 4/2015 | Aoi | 248/430 |
| 2011/0012005 A1 | 1/2011 | Jahner et al. | |
| 2011/0095161 A1* | 4/2011 | Hayashi et al. | 248/430 |
| 2011/0108697 A1* | 5/2011 | Ito et al. | 248/429 |
| 2012/0205512 A1* | 8/2012 | Fujishiro et al. | 248/429 |
| 2013/0206950 A1* | 8/2013 | Hayashi | 248/429 |
| 2013/0256493 A1* | 10/2013 | Hayashi | 248/429 |
| 2013/0264454 A1* | 10/2013 | Hayashi | 248/429 |
| 2014/0042289 A1* | 2/2014 | Kawano | 248/429 |
| 2015/0060626 A1* | 3/2015 | Hayashi | 248/429 |
| 2015/0090853 A1* | 4/2015 | Arakawa | 248/429 |
| 2015/0090854 A1* | 4/2015 | Hayashi | 248/429 |
| 2015/0090855 A1* | 4/2015 | Arakawa et al. | 248/429 |

OTHER PUBLICATIONS

Written Opinion from PCT/JP2013/077456 dated Dec. 27, 2013.

* cited by examiner

VEHICLE SLIDE RAIL DEVICE

TECHNICAL FIELD

The present invention relates to a vehicle slide rail device which supports a seat in a slidable manner.

BACKGROUND ART

A vehicle slide rail device is known, as an example, which is provided with a pair of left and right lower rails which are fixed to a vehicle interior floor and extend in the forward/rearward direction; a pair of left and right upper rails which are slidable relative to the left and right lower rails; lock springs, supported by the upper rails; and lock-release levers which are respectively supported by the upper rails so that the lock-release levers are rotatable between a locked position, in which the lock-release levers do not act on the lock springs, and an unlocked position, in which the lock-release levers act on the lock springs. A large number of lock grooves, which are open at the lower ends thereof, are formed in each lower rail, of the slide rail device, and are arranged in a forward/rearward direction. A plurality of forward/rearward restriction grooves, which are open at the lower ends thereof, are formed in each upper rail and are arranged in the forward/rearward direction. The lock spring is provided with a plurality of locking portions, provided with a front and rear pair of locking sections, which are constantly positioned in the forward/rearward restriction grooves and can enter and escape from the lock grooves from below, at different forward/rearward positions thereon.

When the lock release lever is at the locked position, since the lock-release lever does not act against the lock spring, the locking sections of each locking portion are positioned within the lock grooves, and accordingly, the sliding of the seat and upper rails relative to the lower rails is restricted.

On the other hand, when the lock release lever is at the unlocked position, since the lock release lever acts against the lock spring so that each locking portion moves downward, the locking sections of each locking portion escape from the lock grooves. Accordingly, when the lock release lever is moved to the unlocked position, the seat and upper rails become slidable relative to the lower rails.

CITATION LIST

Patent Literature

PATENT LITERATURE 1: U.S. Pat. No. 5,524,504

SUMMARY OF THE INVENTION

Technical Problem

Upon a locking/unlocking operation being carried out by the lock release lever, since the lock portions (locking sections) enter into, and escape from, the lock grooves, the lock portions (locking sections) come in contact with the lock grooves.

Accordingly, when the locking/unlocking operation via the lock release lever is repeatedly carried out, or when a forward or a rearward load is applied to the upper rails due to the load that is applied by a passenger, etc., sitting on the seat, in a locked state, the lock portions (locking sections) contact the inner surfaces of the corresponding forward/rearward restriction grooves while elastically deforming by a large amount. Hence, a repeated large load occurs (stress occurs) on the lock portions (locking sections); however, in slide rail devices of the related art, no attempts have been made to prevent breakage of the lock portions (locking sections) caused by the elastic deformation of the lock portions (locking sections).

The present invention provides a slide rail device, in which the lock portions do not easily break even if the locking/unlocking operation is repeatedly carried out by the lock release lever or a load being applied in the forward/rearward direction on the upper rails of the seat in a locked state while having a structure that provides a lock spring having lock portions which are positioned within the forward/rearward restriction grooves of the upper rail and can enter into and escape from lock grooves of the lower rail.

Solution to Problem

A vehicle slide rail device according to the present invention is characterized by including a lower rail which extends in a forward/rearward direction and is provided with a large number of lock grooves, which are arranged in the forward/rearward direction, the lower rail being immovable relative to a floor of the vehicle; an upper rail which is slidable in the forward/rearward direction relative to the lower rail and is provided with a plurality of forward/rearward movement restriction grooves which are arranged in the forward/rearward direction; a lock spring, which is slidable together with the upper rail relative to the lower rail, provided with a locking portion which includes a pair of front and rear locking sections which are respective positioned within the forward/rearward movement restriction grooves and can selectively enter into, and escape from, the lock grooves; and a lock release lever, supported by the upper rail, which is rotatable between a locked position, at which the locking sections are allowed to engage with the lock grooves by a biasing force of the lock spring, and an unlocked position, at which the lock release lever presses the lock spring in a direction such that the locking sections escape from the lock grooves against the biasing force. A rear portion of the front locking section and a front portion of the rear locking section, of the locking portion, contact inner surfaces of corresponding the lock grooves, respectively. A forward/rearward distance between a front surface of the front locking section and a front surface of a corresponding the forward/rearward movement restriction groove, and a forward/rearward distance between a rear surface of the rear locking section and a rear surface of a corresponding the forward/rearward movement restriction groove, are narrower than each of a forward/rearward distance between a rear surface of the front locking section and a rear surface of a corresponding the forward/rearward movement restriction groove, and a forward/rearward distance between a front surface of the rear locking section and a front surface of a corresponding the forward/rearward movement restriction groove.

The lock spring can include a plurality of the locking portions, which are provided at different positions in the forward/rearward direction. The locking portions include at least one positioning locking-portion, in which a rear portion of the front locking section thereof and a front portion of the rear locking section thereof both contact inner surfaces of corresponding the lock grooves, respectively, and at least one spaced-apart locking portion, in which a rear portion of the front locking section thereof and a front portion of the rear locking section thereof are both spaced apart from inner surfaces of corresponding the lock grooves, respectively. A forward/rearward distance between a front surface of the front locking section of the positioning locking-portion and a front surface of a corresponding forward/rearward movement restriction groove, and a forward/rearward distance between a rear surface of the rear locking section of the positioning locking-portion and a rear surface of the corresponding forward/rearward movement restriction groove, are narrower than each of a forward/rearward distance between a front surface of the front locking section of the spaced-apart locking portion and a front surface of a corresponding forward/rearward movement restriction groove, and a forward/rearward distance between a rear surface of the rear locking section of the spaced-apart locking portion and a rear surface of the corresponding forward/rearward movement restriction groove.

Advantageous Effects of the Invention

In the lock portion of the lock spring according to the present invention, the rear portion of the front locking section and the front portion of the rear locking section both contact the inner surfaces of the lock grooves of the lower rail.

Furthermore, the forward/rearward distance between the front surface of the front locking section of the locking portion and the front surface of the corresponding forward/rearward restriction groove, and the forward/rearward distance between the rear surface of the rear locking section and the rear surface of the corresponding forward/rearward restriction groove, are narrower than each of forward/rearward distance between the rear surface of the front locking section and the rear surface of the corresponding forward/rearward restriction groove, and the forward/rearward distance between the front surface of the rear locking section and the front surface of the corresponding forward/rearward restriction groove. Accordingly, when a locking/unlocking operation is carried out by the lock release levers or when a forward or rearward load is applied to the upper rail due to the load of a passenger, etc., sitting on the seat, which is in a locked state, even if one of the front or rear locking sections (which compose part of the locking portions) contacts an inner surface of the corresponding forward/rearward restriction grooves while elastically deforming, with the contacting portion with the corresponding lock grooves as a base point, the amount of deformation thereof is not very much. Therefore, the load on the locking sections of the locking portions can be reduced.

DESCRIPTION OF EMBODIMENTS

Figure 1:
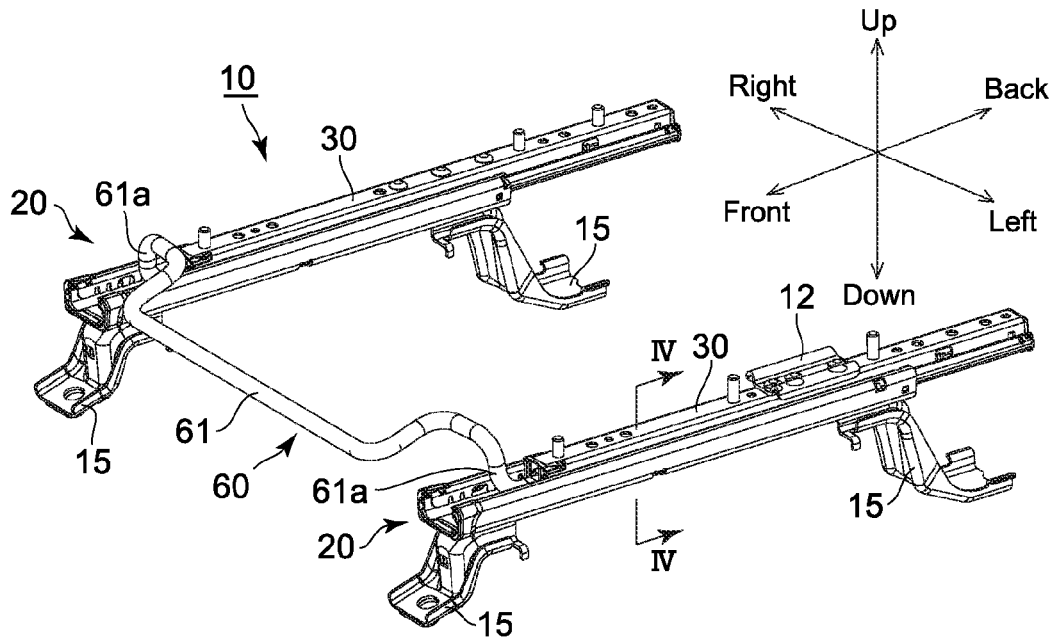
FIG. 1 is a front perspective view showing an embodiment of a right-sided slide seat device (of a driver seat), according to the present invention, viewed obliquely from above, in which the upper rails have been slid to the rear ends.
Figure 2:
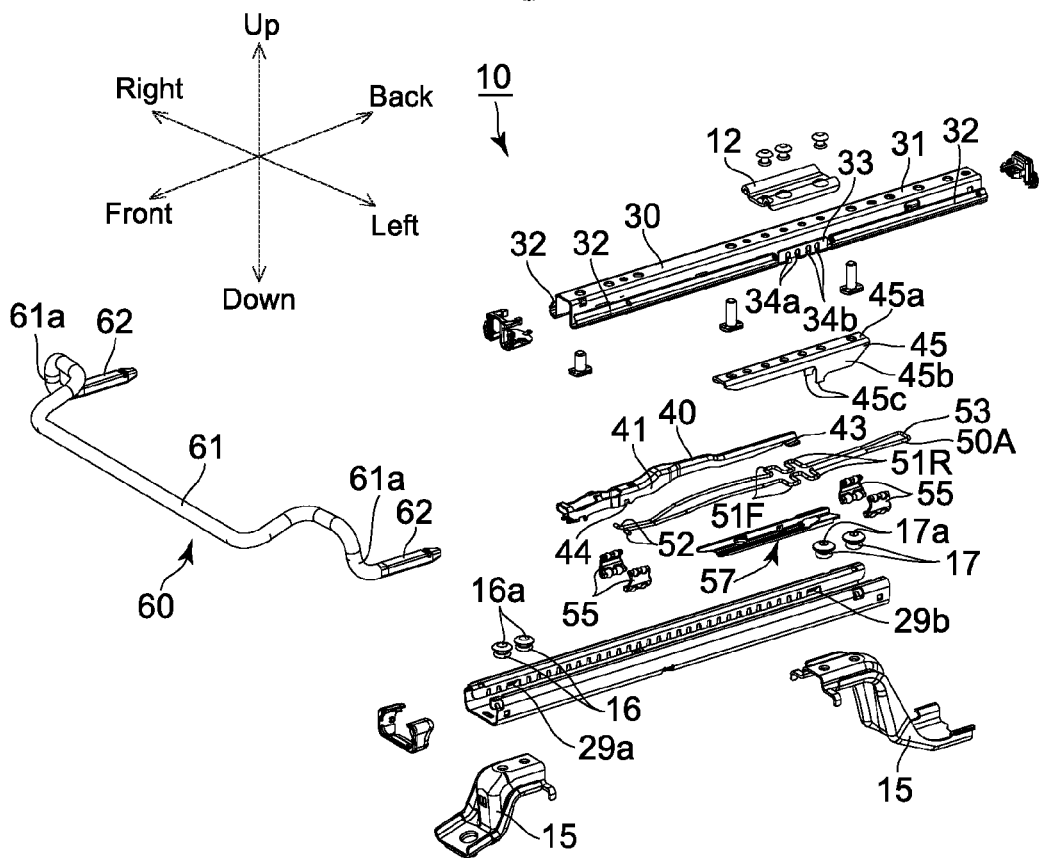
FIG. 2 is a front exploded perspective view showing the right-sided slide rail device with the right rail unit omitted, viewed obliquely from above.

An embodiment of the present invention will be hereinafter discussed with reference to FIGS. 1 through 17. Note that directions described in the following description are defined based on the directions of arrows shown in the drawings.

A slide rail device 10 is installed onto a vehicle interior floor of an automobile (vehicle), not shown in the drawings. A seat (provided with a seatback and a seat cushion) is fixed to upper surfaces of the slide rail device 10 (upper rails 30).

The detailed structure of the slide rail device 10 will be discussed hereinafter.

The slide rail device 10 supports a right seat (or driver seat) and is provided, as large components thereof, with a pair of left and right rail units 20, and a loop handle 60 which connects the front ends of the left and right rail units 20.

The left and right rail units 20 have the following structure.

Figure 5:
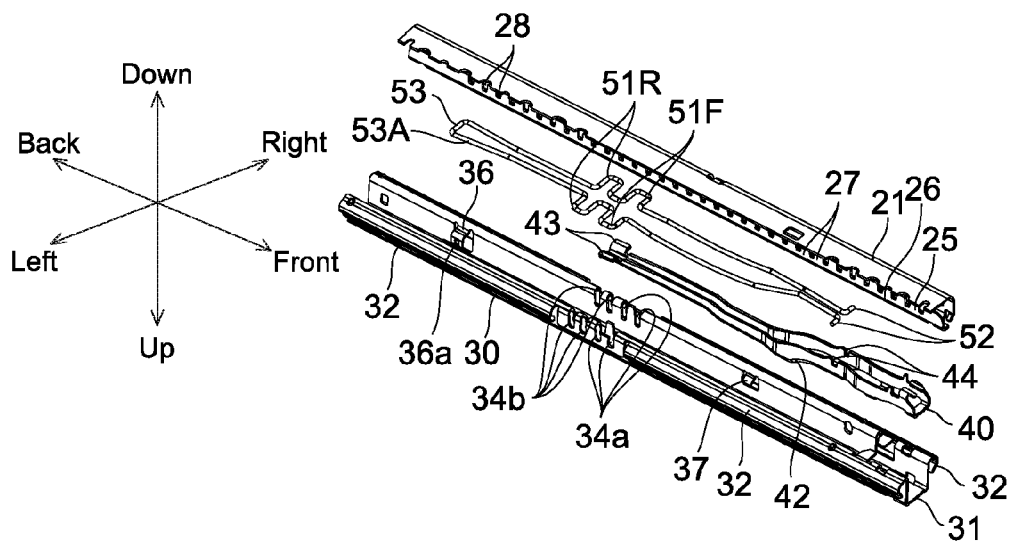
FIG. 5 is an exploded perspective view of a rail unit showing the lower rail in a longitudinal sectional view.

The rail units 20 are provided with a pair of left and right lower rails 21, which are mutually bilaterally symmetrical, which are mounted onto the vehicle interior floor via a pair of front and rear brackets 15. Each lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, left and right pair of roof underside portions 24 which extend inward from the top edges of the left and right pair of outer wall portions 23, respectively, and a pair of left and right inner wall portions 25 which extend downwardly from the inner edges of the left and right roof underside portions 24. The front and rear brackets 15 are fixed to the close vicinity of both the front and rear ends of the lower rails 21 via two rivets 16 and 17 each. Heads 16a and 17a (mount projections) of the rivets 16 and 17 are each positioned immediately above the bottom wall 22. As shown in FIG. 5, etc., the upper edge portions of the left and right inner wall portions 25 (the portions connected to the roof underside portions 24) constitute base-end supporting portions 26 that extend in the forward/rearward direction. Lower edge portions of the left and right inner wall portions 25 are provided with a large number of lock teeth (lock mechanism) 27, the upper ends thereof connecting with the base-end supporting portions 26, arranged at equal intervals in the forward/rearward direction. Lock grooves 28 (lock mechanism), the bottom ends of which are open, are formed between mutually adjacent lock teeth 27. The pitch between all adjacent lock grooves 28 (forward/rearward distance) is the same, and the forward/rearward width of each lock groove 28 is the same. Furthermore, the lower edge portions of the left and right inner wall portions 25 are provided with front-end stoppers 29a (stopper projections) and rear-end stoppers 29b (stopper projections), respectively positioned at the close vicinity of the front end of the lower rail 21 and at the close vicinity of the rear end of the lower rail 21, which are formed by being cut and raised. The right front-end stopper 29a and the right rear-end stopper 29b are cut and raised in an oblique direction toward the right side, and the left front-end stopper 29a and the left rear-end stopper 29b are cut and raised in an oblique direction toward the left side. Furthermore, the forward/rearward widths of the front-end stoppers 29a and the rear-end stoppers 29b are wider than the lock teeth 27.

Each rail unit 20 is provided with an upper rail 30 that is slidable in the forward/rearward direction with respect to the associated lower rail 21.

Figure 3:
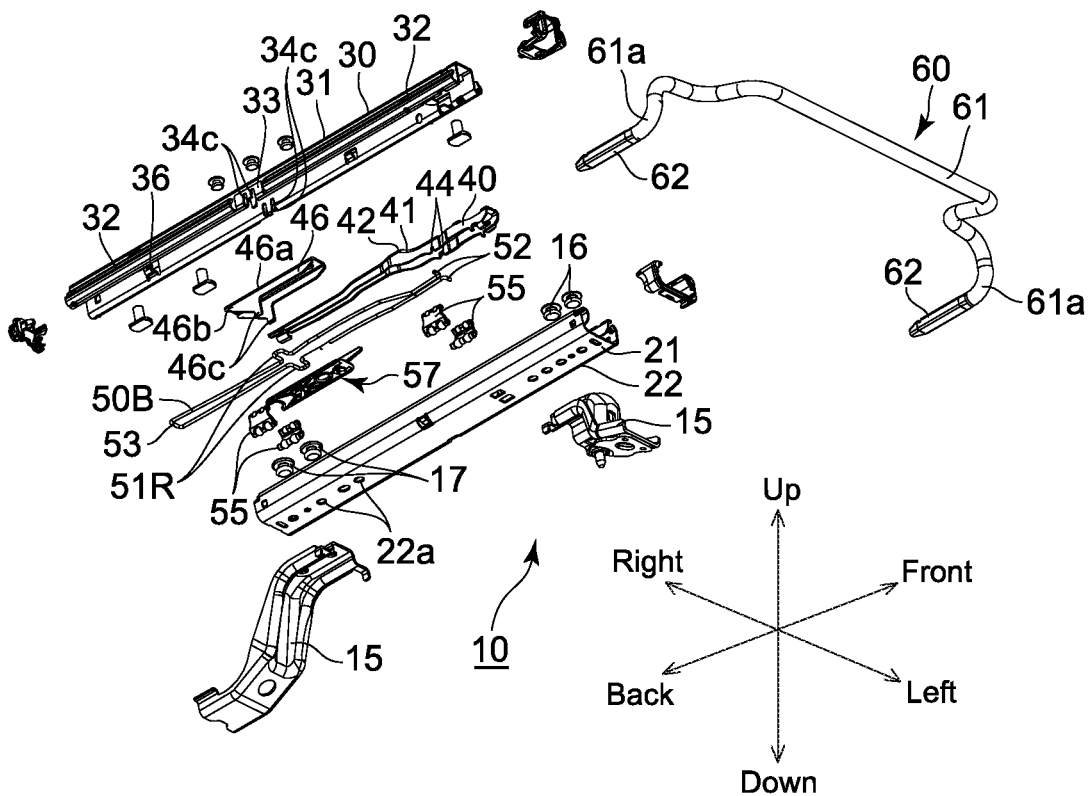
FIG. 3 is a front exploded perspective view showing the right-side slide rail device with the left rail unit omitted, viewed obliquely from below.
Figure 6:
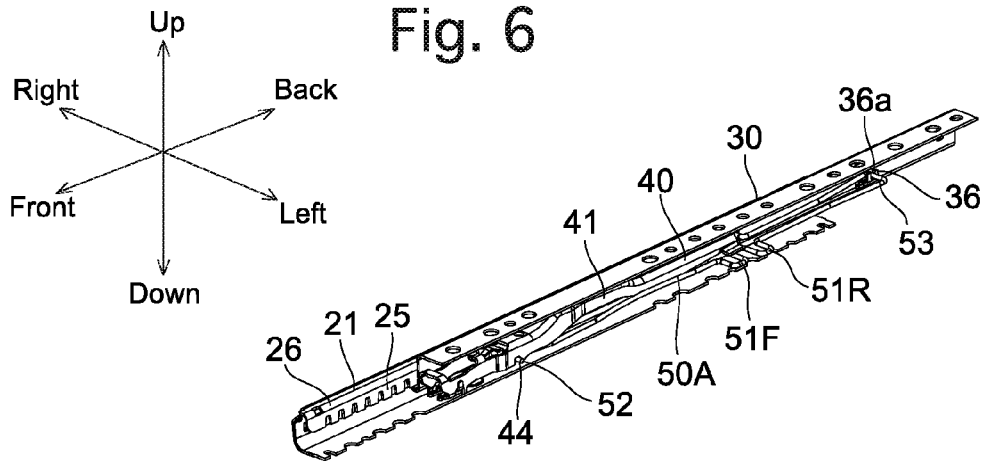
FIG. 6 is a front perspective view of the rail unit showing a cross sectional view of the lower rail, viewed obliquely from above.
Figure 7:
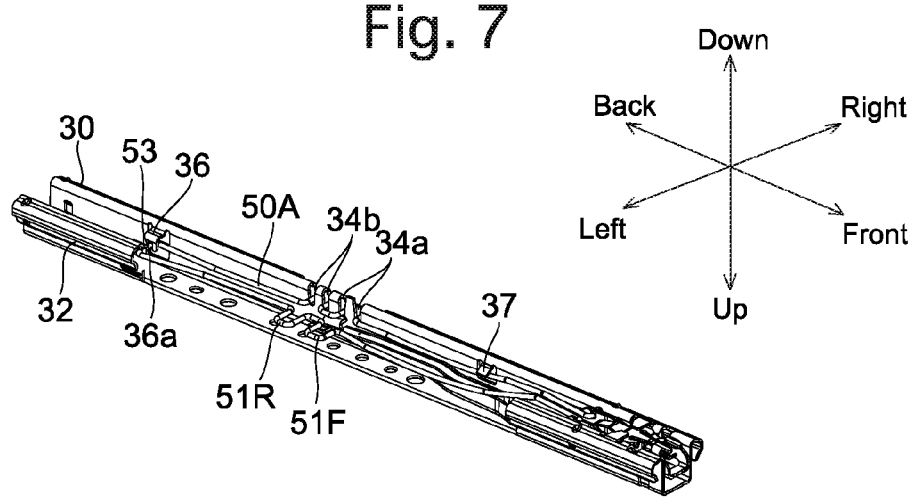
FIG. 7 is a front perspective view of the upper rail, with a section thereof cut-away, a lock-release lever, and a lock spring, viewed obliquely from below.

The left upper rail (inner upper rail) 30 is a metal channel member which extends in the forward/rearward direction and the bottom thereof is open, and is provided with a base 31 having a substantially inverted U-shaped cross section, upright walls 32 which extend upward from lower end portions of the left and right side walls of the base 31, excluding central portions thereof in the longitudinal direction, and locking walls (stopper portions) 33 which extend upward from the above-mentioned central portions of the side walls. As shown in FIGS. 2, 3, 5 and 9, etc., four forward/rearward movement restriction grooves 34a and 34b are formed over the lower edges of the left and right locking walls 33 and the lower edges of the side walls of the base 31 to extend upward. Each pitch (forward/rearward distance) between the adjacent forward/rearward movement restriction grooves 34a and 34b is the same. However, the forward/rearward width of the two rear forward/rearward movement restriction grooves 34b is shorter than the forward/rearward width of the two front forward/rearward movement restriction grooves 34a by 0.3 mm. Furthermore, as shown in FIGS. 3, 6 and 7, lock-engaging lugs 36, which are formed by cutting and raising, are formed on rear portions of the left and right side wall portions of the base portion 31 and extend inwardly, and thereafter, upwardly. The upper edges of the left and right lock-engaging lugs 36 are provided therein with downward-extending spring lock-engaging grooves 36a. Lock-engaging lugs 37, which are formed by cutting and raising portions of the left and right side wall portions of the base portion 31, are respectively positioned slightly in front of central portions of the left and right side wall portions, and extend inwardly.

The right upper rail (outer upper rail) 30 has the same structure as that of the left upper rail 30 except for the forward/rearward length of the locking walls 33 being shorter than those of the left upper rail 30 and the number of the forward/rearward movement restriction grooves 34c formed in each locking walls 33 being two.

A metal upper reinforcement member 12 for increasing the rigidity of the upper rail 30 is mounted on the upper surface of the left upper rail (inner upper rail) 30 so that the forward/rearward position thereof aligns with that of the locking walls 33.

Furthermore, a metal inner reinforcement member 45 for increasing the rigidity of the upper rail 30 is mounted on an inner surface of the base portion 31 of the left upper rail (inner upper rail) 30. The inner reinforcement member 45 is provided with a mounting portion 45a which comes in contact with the underside surface of the roof underside portion of the base portion 31 and is mounted to the roof underside portion via rivets, a pair of side portions 45b which extend downwardly from the left and right side edges of the mounting portion 45a, and a pair of downward extensions 45c which extend downward from the left and right side portions 45b.

On the other hand, a metal inner reinforcement member 46 for increasing the rigidity of the upper rail 30 is mounted on an inner surface of the base portion 31 of the right upper rail (outer upper rail) 30. The inner reinforcement member 46 is provided with a mounting portion 46a which comes in contact with the underside surface of the roof underside portion of the base portion 31 and is mounted to the roof underside portion via rivets, a pair of side portions 46b which extend downwardly from the left and right side edges of the mounting portion 46a, and a pair of downward extensions 46c which extend downward from the left and right side portions 45b.

Each rail unit 20 is further provided with a lock release lever 40 that is installed in the associated upper rail 30, lock springs 50A/50B, and a foreign-object interference member 57.

The lock release lever 40 is a press-molded metal channel member, formed from a metal plate, which extends in the forward/rearward direction and the bottom thereof is open, and is provided with a pair of left and right side walls 41. As shown in FIGS. 2, 5, 10 and 11, etc., a rotational contact protrusion 42 which extends in the leftward/rightward direction protrudes from an upper surface of the lock release lever 40. In addition, a pair of left and right substantially horizontal spring pressing-pieces 43 are respectively provided on the rear end portion of the lock release lever 40, and upward-facing spring-hook grooves 44 are formed in the lower edges of the front portions (the portions positioned forward from the rotational contact protrusion 42) of the left and right side walls 41, respectively.

Each of the lock spring 50A that is attached to the left upper rail (inner upper rail) 30 and the lock spring 50B that is attached to the right upper rail (outer upper rail) 30 is a bilaterally-symmetrical member formed by bending a single metal wire material.

Figure 16:
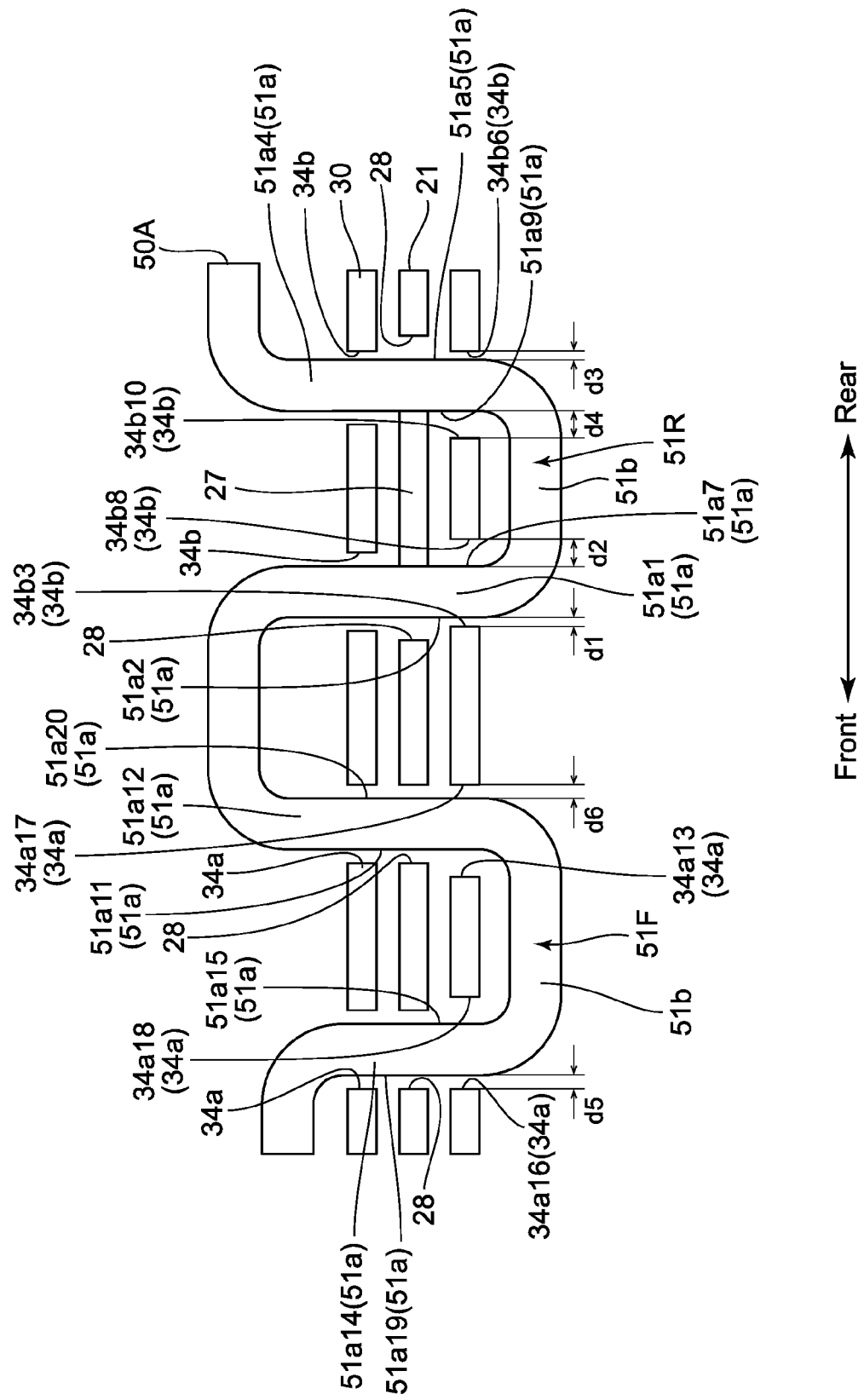
FIG. 16 is an enlarged plan view showing parts of the lower rail, the upper rail and the lock spring, with the lower rail and upper rail shown in cross section.
Figure 17:
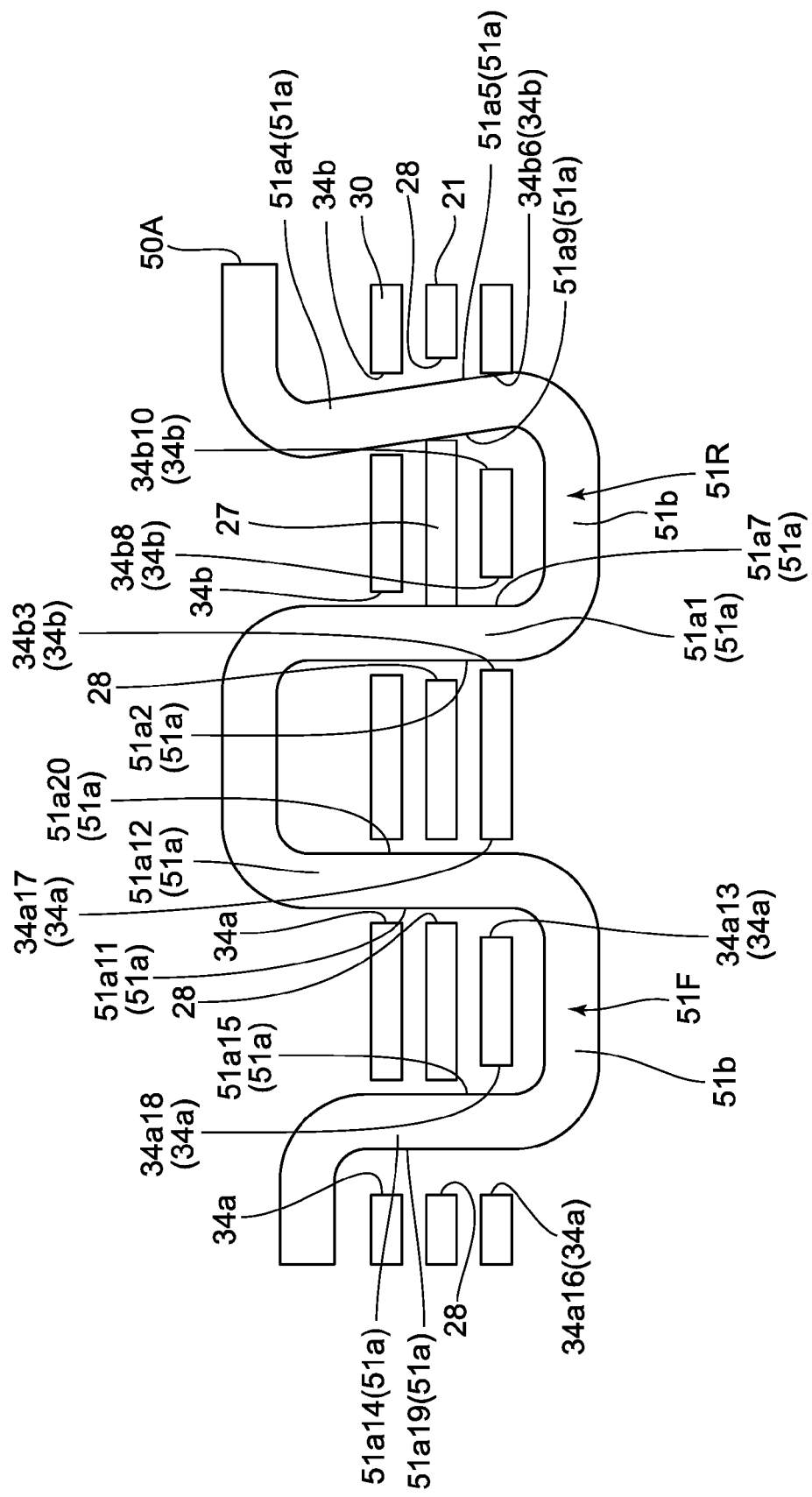
FIG. 17 is an enlarged plan view similar to FIG. 16 of when part of the lock spring contacts an inner surfaces of some forward/rearward restriction grooves.

A pair of front and rear locking portions (lock mechanism) 51F and 51R, which extend in substantially horizontal directions and extend outwardly, are formed on a portion of each of the left and right side of the lock spring 50A at a position slightly rearward from a central portion with respect to the longitudinal direction thereof. Each of the locking portions 51F and 51R is integrally provided with a pair of front and rear locking sections 51a which linearly extend outwardly (the left locking sections 51a extend leftward and the right locking sections 51a extend rightward) from the main body of the lock spring 50A, and connecting sections 51b which extend in the forward/rearward direction to connect the fore-ends of adjacent pairs of the locking sections 51a. As shown in FIGS. 16 and 17, the forward/rearward distance between opposing surfaces of the pairs of locking sections 51a that compose part of each locking portion 51R is shorter than the forward/rearward distance between opposing surfaces of the pairs of locking sections 51a that compose part of each locking portion 51F by 1.3 mm. A section of the lock spring 50A that is positioned further rearward than the locking portions 51R is substantially horizontal in a free state, and a section of the lock spring 50A that is positioned further forward than the locking portions 51F is substantially horizontal in a free state. A pair of left and right front-end locking lugs 52, which extend outwardly in a substantially horizontal direction, are formed on the front end of the lock spring 50A. Furthermore, the rear end portion of the lock spring 50A is provided with a rear-end lock-engaging portion 53, which extends in the leftward/rightward direction in a plan view.

On the other hand, the lock spring 50B has the same structure as that of the lock spring 50A except for there being only one locking portion 51R provided on each of the left and right sides (the locking portions 51R of the lock spring 50B have the same specifications that those of the locking portions 51R of the lock spring 50A).

Figure 9:
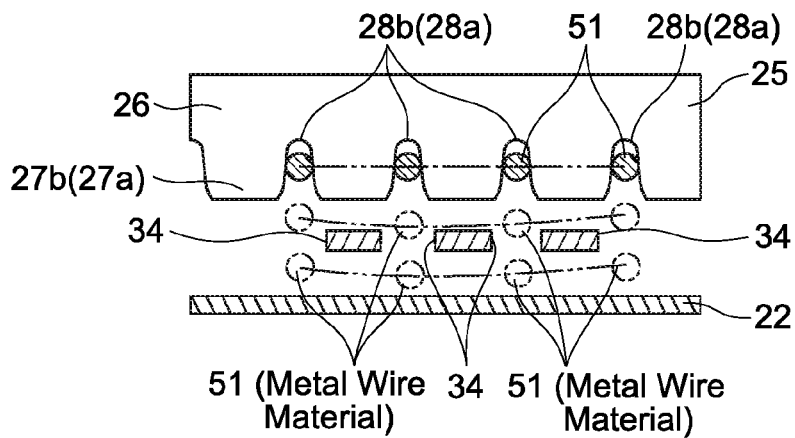
FIG. 9 is a schematic side elevational view showing states of the lock spring when the lock-release lever is positioned at the locked position and the unlocked position.
Figure 10:
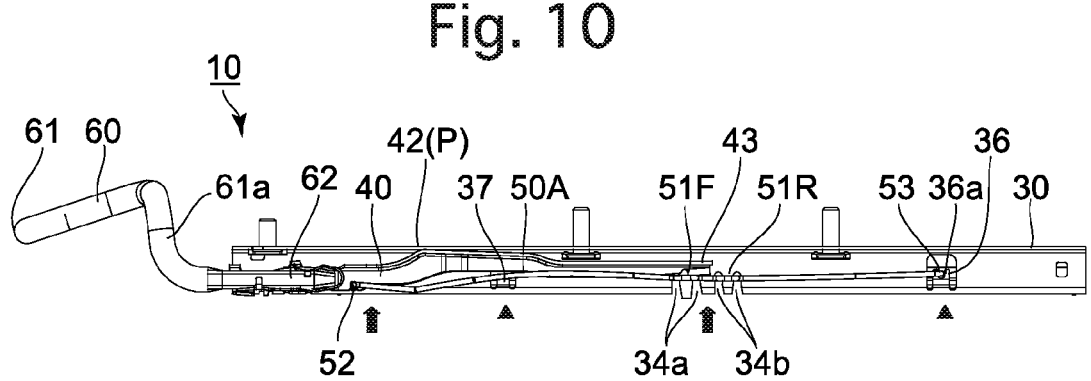
FIG. 10 is a side elevational view of the upper rail, the lock-release lever, a lock spring and a loop handle, when in a locked state, in which only the upper rail is shown as a longitudinal section view.
Figure 11:
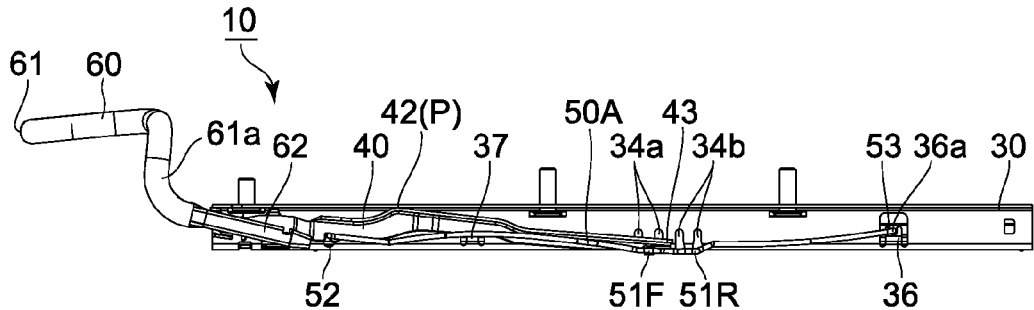
FIG. 11 is side elevational view similar to that of FIG. 10 when in an unlocked state.
Figure 12:
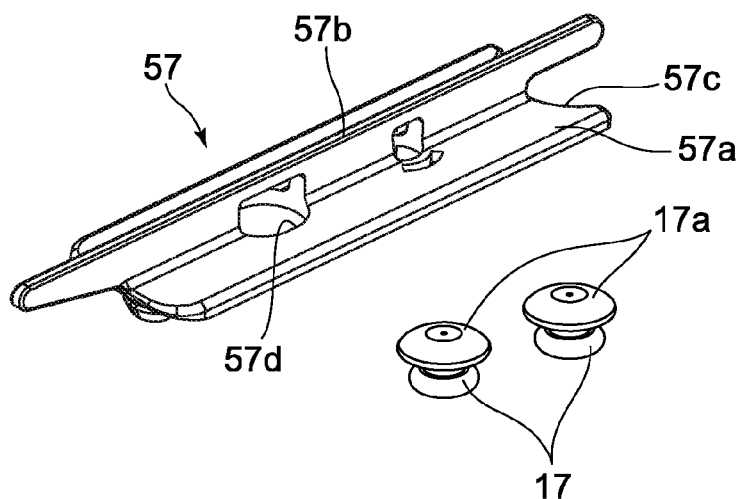
FIG. 12 is an enlarged front perspective view of a foreign-object interference member and rivets, as viewed obliquely from above.
Figure 13:
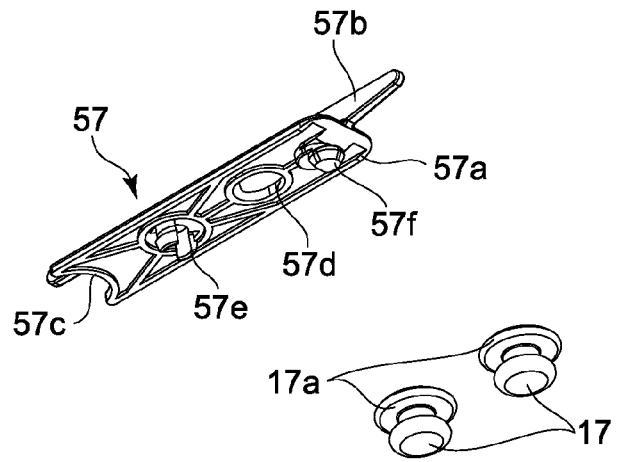
FIG. 13 is an enlarged front perspective view of a foreign-object interference member and rivets, as viewed obliquely from below.

The lock release lever 40 is almost entirely accommodated in the associated upper rail 30 from the front end opening thereof, and the rotational contact protrusion 42 is in contact with a roof undersurface of the base 31 (see a contact portion "P" in FIGS. 10 and 11. Spaces are formed between the upper surface of the lock release lever 40, except the rotational contact protrusion 42, and a roof undersurface of the base 31). As shown in FIGS. 6 through 8, FIG. 10 and FIG. 11, in the lock spring 50A/50B, the rear-end lock-engaging portion 53 is lock-engaged, from above, with the left and right spring lock-engaging grooves 36a of the lock-engaging lugs 36 (see the triangular mark in FIG. 10), portions that are positioned slightly forward from the locking portions 51F and 51R of the left and right sides are respectively lock-engaged with the left and right lock-engaging lugs 37 (see the triangular mark in FIG. 10), the locking portions 51F and 51R are engaged with the corresponding forward/rearward movement restriction grooves 34a, 34b and 34c from below, and furthermore, the left and right front-end locking lugs 52 are lock-engaged with the spring-hook grooves 44 from below (see arrows ↑ shown in FIG. 10), and the spring pressing-pieces 43 abut against upper surfaces of the lock spring 50A/50B near the locking portions 51F and 51R. Hence, upon attaching the lock spring 50A/50B to the upper rail 30 and the lock release lever 40, the lock spring 50A/50B is moveable relative to the upper rail 30 in the forward/rearward direction within a very small range, such that the lock-engagement of the rear-end lock-engaging portion 53 of the lock spring 50A/50B with the lock-engaging lug 36 is not released and the lock-engagement of the front-end locking lugs 52 is maintained with the spring-hook grooves 44. In addition, since the lock spring 50A/50B produces an upward biasing force (elastic force) by being elastically deformed (see arrows ↑ shown in FIG. 10), this biasing force causes the rotational contact protrusion 42 of the lock release lever 40 to be pressed against the roof underside portion of the base 31, which enables the lock release lever 40 to rotate about the rotational contact protrusion 42 (about an imaginary rotation axis extending in the leftward/rightward direction) about the contact portion P between the roof underside portion and the rotational contact protrusion 42, and the lock release lever 40 is held in the locked position shown in FIGS. 10 and 15 when no upward external force is exerted on the front end portion of the lock release lever 40. On the other hand, exerting an upward external force on the front end portion of the lock release lever 40 against the biasing force of the lock spring 50A/50B causes the lock release lever 40 to rotate to the unlocked position shown in FIG. 11. Thereupon, since the spring pressing-pieces 43 of the lock release lever 40 downwardly depresses the lock spring 50A/50B, each locking portion 51F and 51R escapes downward from the associated lock groove 28 (see the locking portions 51F and 51R indicated with the imaginary lines shown in FIG. 9).

Figure 4:
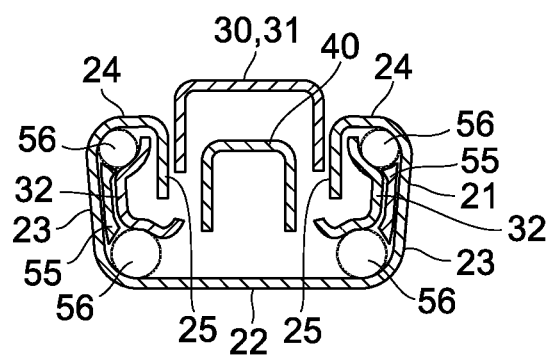
FIG. 4 is a cross sectional view taken along the line IV-IV shown in FIG. 1.

Upon an assembly being made by inserting an upper rail 30, a lock release lever 40 and a lock spring 50A/50B, which are integrated in the above described manner, into a lower rail 21 from the front end opening or rear end opening of the lower rail 21, the upright walls 32 and the locking walls 33 of the upper rail 30 enter the spaces formed between the outer wall portions 23 and the inner wall portions 25 as shown in FIG. 4 (the locking walls 33 are omitted in FIG. 4), and a plurality of bearing balls 56 which are rotatably supported by retainer rear-end curved portions 55 installed in the aforementioned spaces are in rotatable contact with both outer surfaces of the upright walls 32 and inner surfaces of the outer wall portions 23, which allow the upper rail 30 (and the lock release lever 40 and the lock spring 50A/50B) to slide in the forward/rearward direction with respect to the lower rail 21. In other words, the upper rail 30 becomes slidable between a front-end position (the position shown in FIG. 14), at which the front-end stoppers 29a abut against the front end surfaces of the left and right locking walls 33, and a rear-end position (the position shown in FIG. 1), at which the rear end surfaces of the left and right locking walls 33 abut against the rear-end stoppers 29b.

Figure 8:
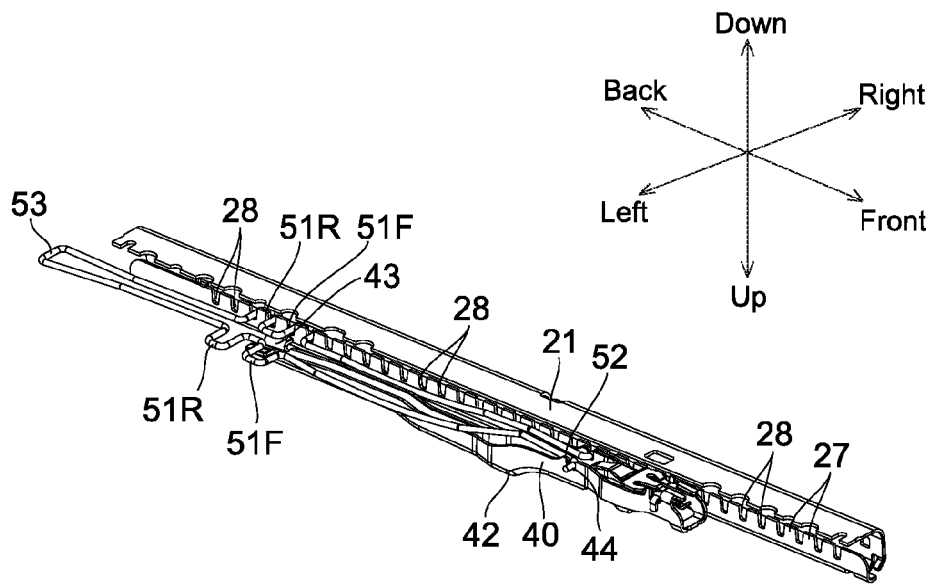
FIG. 8 is a front perspective view of the lower rail, shown as a longitudinal section view, the lock-release lever, and the lock spring, viewed obliquely from below.

In addition, when the lock release lever 40 is in the locked position, the upper rail 30 is prevented from sliding with respect to the lower rail 21 because the spring pressing-pieces 43 contact, from above, the upper surfaces of the lock spring 50A/50B (FIG. 15), and each locking portion 51F and 51R is engaged with the associated forward/rearward movement restriction groove 34a, 34b and 34c and the lock grooves 28 from below as shown in FIG. 8 and by solid lines in FIG. 9. On the other hand, rotating the lock release lever 40 down to the unlocked position causes each locking portion 51F and 51R to be retained in the forward/rearward movement restriction grooves 34a, 34b and 34c, as shown by the phantom lines in FIG. 9, while being disengaged downward from the lock grooves 28 (with which the locking portions 51F and 51R were engaged) thereby allowing the upper rail 30 to slide with respect to the lower rail 21.

Upon assembling the lower rail 21, the upper rail 30, the lock release lever 40 and the lock spring 50A/50B, the upper rail 30 is slid to the front-end position, and the foreign-object interference member 57 is attached to the bottom wall 22 of the lower rail 21.

The foreign-object interference member 57 is a synthetic-resin unitarily molded product, and is provided with a tabular plate-portion 57a which is substantially horizontal and extends in the forward/rearward direction, and a tabular partition portion 57b which extends in the forward/rearward direction and projects upwardly from a central section, with respect to the width direction, of the plate-portion 57a. As shown in the drawings, the front end portion of the partition portion 57b is positioned further forward than the front end portion of the plate-portion 57a. A rivet relief recess 57c, which is round in shape in a plan view, is formed in the rear end of the plate-portion 57a, and a rivet relief hole 57d, which is round in shape in a plan view, is formed in the vicinity of the central portion of the plate-portion 57a as a through-hole. Furthermore, a pushnut 57e and a hook-shaped hooking portion 57f are provided on the underside of the plate-portion 57a and project downwards.

The foreign-object interference member 57 is mounted onto the bottom wall 22 by lock-engaging the hooking portion 57f with one of two mount through-holes 22a formed near the rear end of the bottom wall 22, and press-fitting, while elastically deforming, the pushnut 57e into the other of the mount through-holes 22a. Hence, when the foreign-object interference member 57 is mounted onto the bottom wall 22 in such a manner, the head 17a of the rivet 17 that is positioned at the front is positioned within the rivet relief hole 57d, and the head 17a of the rivet 17 that is positioned at the rear is positioned within the rivet relief recess 57c.

Figure 14:
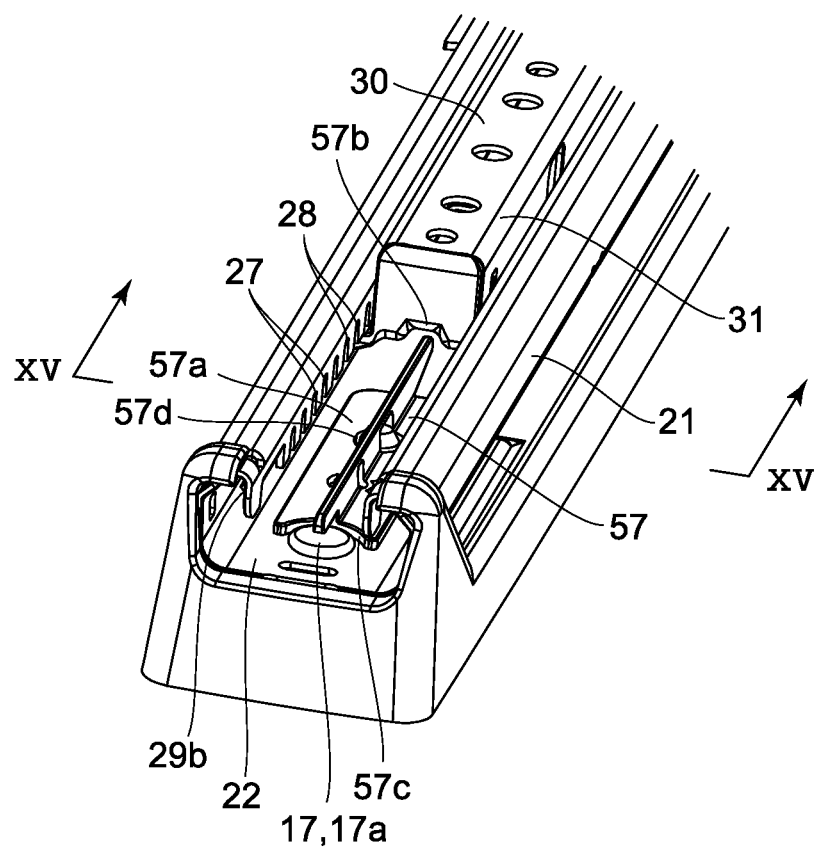
FIG. 14 is an enlarged perspective view of a rear portion of a rail unit in a state where the upper rail is positioned at the front end position, as viewed from the rear.
Figure 15:
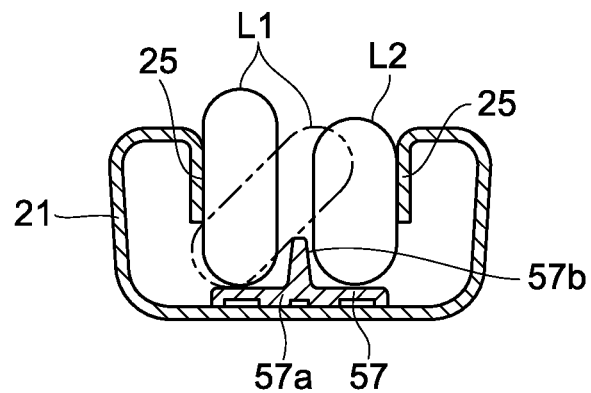
FIG. 15 is a cross-sectional view, viewed in the direction of the arrows XV-XV of FIG. 14.

Upon the foreign-object interference member 57 being mounted onto the upper surface of the bottom wall 22, when the upper rail 30 has been slid to the front-end position, the front-end portion of the partition portion 57b is positioned forward from the rear-end of the upper rail 30 (see FIG. 14. The front-end portion of the partition portion 57b can be positioned at the same forward/rearward position as that of the rear end of the upper rail 30). Whereas, the rear-end portion of the partition portion 57b extends further rearward than the rear-end stoppers 29b.

Accordingly, a seat cushion of a seat (not shown) is mounted onto the upper surfaces of the upper rails 30 with the assembled pair of left and right rail units 20 arranged mutually parallel to each other and at a mutually aligned position in the forward/rearward direction (slide positions of the upper rails 30 relative to the lower rails 21 are also aligned).

Hence, upon integrating the left and right rail units 20 with the seat 11, the loop handle 60 is connected to the left and right lock release levers 40.

The metal loop handle 60 is provided with an operation portion 61 which extends in the leftward/rightward direction, a pair of inclined portions which extend in an inclined direction outwards from the left and right sides of the operation portion 61, downward-portions 61a which respectively extend downwards from the left and right sides of the inclined portions, and a pair of rear-end connecting portions 62 which extend rearwardly from the lower ends of the left and right downward-portions 61a.

The loop handle 60 is connected to the front end portions of the lock release levers 40 by inserting the left and right rear-end connecting portions 62 into the inner spaces of the front end portions of the lock release lever 40, respectively, from the front side.

An assembled slide rail device 10 is attached to the vehicle interior floor by mounting the mounting brackets 15, to which the left and right lower rails 21 are mounted, onto the vehicle interior floor.

Next the operation of the slide rail device 10 will be described hereinbelow.

When the lock release levers 40 are positioned at the locked position, since the locking portions 51F and 51R of each of the lock springs 50A and 50B are positioned within the lock grooves 28 of the lower rails 21, the sliding operation in the forward/rearward direction of the upper rail 30 relative to the lower rails 21 is restricted.

Upon the occupant grasping the operation portion 61 by hand and rotating the entire loop handle 60 upwards, when the lock release levers 40 are positioned at the locked position, the lock release levers 40 rotate upwardly with the rear-end connecting portions 62. Accordingly, since the lock release levers 40 that were positioned at the locked position rotate to the unlocked position (FIG. 11) and the locking portions 51F and 51R escape downward from the lock grooves 28 of the lower rails 21, the upper rails 30, which were restricted from sliding relative to the lower rails 21, become slidable relative to the lower rails 21.

Furthermore, as shown in FIG. 14, the inner space (upper surface) of the rear-end portion of each lower rail 21 is upwardly exposed by positioning each upper rail 30 at the front end position. If a passenger, etc., were to drop a lighter L1 (see FIG. 15) into a rear-end portion of a lower rail 21 in such a state, the lighter L1 interferes with the partition portion 57b of the foreign-object interference member 57 (also in the case of a lighter L2, shown in FIG. 15, having a different cross-sectional shape to that of the lighter L1). Accordingly, there is a high possibility that a side (the lower side in FIG. 15) of the lighter L1 (L2) either contacts (surface contacts) the upper surface of the plate-portion 57a so that the short-side direction of the lighter L1 (L2) stands up, as shown by the solid lines in FIG. 15, or that a side thereof contacts the upper edge of the partition portion 57b and is lies in an inclined state within the lower rail 21, as shown by the phantom lines in FIG. 15. Therefore, if the upper rail 30 is slid rearwardly so that the lighter L1 (L2) is pushed rearwardly by the rear-end portion of the upper rail 30, the lighter L1 (L2) can be externally ejected from the rear-end opening of the lower rail 21. Furthermore, at this time, since the foreign-object interference member 57 covers the heads 17a of the rivets 17, the lighter L1 (L2) smoothly moves rearwardly along the foreign-object interference member 57 (the plate-portion 57a and the partition portion 57b) without getting caught on the heads 17a.

Furthermore, in the case where the foreign-object interference member 57 is not provided, if a lighter L1 (L2) is dropped into the inner space of the rear portion of a lower rail 21, the entire side surface of the lighter L1 (L2) would come in contact (surface contact) with the upper surface of the bottom wall 22, and there is a possibility of part of the lighter L1 (L2) entering into a gap between the bottom wall 22 and the lower end of an inner wall portion 25. If the upper rail 30 is utilized to rearwardly push the lighter L1 (L2) in this state, there is a possibility that the rear end portion of the lighter L1 (L2) may get caught on a recessed portion, which is formed by the cutting and raising of the rear-end stoppers 29b, on the lower edge of the inner wall portions 25, or may get caught on a head 17a of a rivet 17, so that the lighter L1 (L2) cannot be externally ejected from the lower rail 21.

In the illustrated embodiment, since the front end portion of the foreign-object interference member 57 (partition portion 57b) is positioned further forward than the rear end of the upper rail 30, and the rear end portion of the foreign-object interference member 57 (partition portion 57b) is positioned near the rear end of the lower rail 21, even if a foreign object such as a lighter L1 (L2), etc., is dropped at any position in the rear end portion of the lower rail 21 (exposed end portions), the foreign object such as a lighter L1 (L2), etc., can be externally ejected from the rear end portion of the lower rail 21 using the upper rail 30.

Due to the foreign-object interference member 57 of the illustrated embodiment being simple in structure, manufacture thereof is possible at a low cost.

Furthermore, since the foreign-object interference member 57 is mounted onto the lower rail 21 (since the foreign-object interference member 57 is not connected to the upper rail 30), the assembling of the slide rail device 10 is facilitated, and the manufacturing cost of the entire slide rail device 10 can be reduced.

In addition, since the partition portion 57b of the foreign-object interference member 57 has a thin tabular shape, enlargement of the entire foreign-object interference member 57 can be suppressed. Accordingly, upon attaching the foreign-object interference member 57 onto the lower rail 21, since the foreign-object interference member 57 does not easily interfere with peripheral members (such as, e.g., the upper rail 30), the foreign-object interference member 57 can be easily attached to the lower rail 21.

Furthermore, in the slide rail device 10 of the illustrated embodiment, when the locking portions 51F and 51R of the lock spring 50A/50B are positioned within the lock grooves 28 of the lower rail 21 by the positioning of the lock release lever 40 at the locked position, the opposing surfaces of the pairs of the locking sections 51a of the left and right locking portions 51R contact the forward/rearward end surfaces (inner surfaces of the lock grooves 28) of the corresponding lock teeth 27 (see FIG. 16. The locking portions 51F do not contact the lock teeth 27). Therefore, forward/rearward movement of the upper rail 30 relative to the lower rail 21 can be effectively suppressed.

Furthermore, the forward/rearward distance (d1=0.35 mm) between the front surface (51a2) of the front locking section (51a1) of each locking portion 51R and the inner surface (front surface) (34b3) of the corresponding forward/rearward movement restriction groove 34b, and the forward/rearward distance (d3=0.35 mm) between the rear surface (51a5) of the rear locking section (51a4) of each locking portion 51R and the inner surface (rear surface) (34b6) of the corresponding forward/rearward movement restriction groove 34b, are narrower than each of the forward/rearward distance (d2=1.15 mm) between the rear surface (51a7) of the front locking section (51a1) of each locking portions 51R and the inner surface (rear surface) (34b8) of the corresponding forward/rearward movement restriction groove 34b, and the forward/rearward distance (d4=1.15 mm) between the front surface (51a9) of the rear locking section (51a4) of each locking portion 51R and the inner surface (front surface) (34b10) of the corresponding forward/rearward movement restriction groove 34b. Furthermore, since the forward/rearward distance between the rear surface (51a7) and the front surface (51a9) of the front locking section (51a1) and the rear locking section (51a4), respectively, of each locking portion 51R is shorter than the forward/rearward distance between the rear surface (51a15) and the front surface (51a11) of the front locking section (51a14) and the rear locking section (51a12), respectively, of each locking portion 51F by 1.3 mm, and the forward/rearward widths (between 34b6 and 34b10; between 34b3 and 34b8) of the rear two forward/rearward movement restriction grooves 34b are shorter than the forward/rearward widths (between 34a13 and 34a17; between 34a16 and 34a18) of the front two forward/rearward movement restriction grooves 34a by 0.3 mm, respectively, the forward/rearward distance (d1=0.35 mm) between the front surface (51a2) of the front locking section (51a1) of each locking portion 51R and the inner surface (front surface) (34b3) of the corresponding forward/rearward movement restriction groove 34b, and the forward/rearward distance (d3=0.35 mm) between the rear surface (51a5) of the rear locking section (51a4) of each locking portion 51R and the inner surface (rear surface) (34b6) of the corresponding forward/rearward movement restriction groove 34b, are narrower than each of the forward/rearward distance (d5=0.65 mm) between the front surface (51a19) of the front locking section (51a14) of each locking portions 51F and the inner surface (front surface) (34a16) of the corresponding forward/rearward movement restriction groove 34a, and the forward/rearward distance (d6=0.65 mm) between the rear surface (51a20) of the rear locking section (51a12) of each locking portions 51F and the inner surface (rear surface) (34a17) of the corresponding forward/rearward movement restriction groove 34a. Hence, since the forward/rearward distance (d1) between the front surface (51a2) of the front locking section (51a1) of each locking portions 51R and the inner surface (front surface) (34b3) of the corresponding forward/rearward movement restriction groove 34b, and the forward/rearward distance (d3) between the rear surface (51a5) of the rear locking section (51a4) of each locking portion 51R and the inner surface (rear surface) (34b6) of the corresponding forward/rearward movement restriction groove 34b are both narrowed in such a manner, when the locking/unlocking operation is carried out with the lock release lever 40, or when a forward or a rearward load is applied to the upper rail 30 due to a load applied by a passenger, etc., sitting on the seat in a locked state, even if either the front or rear locking sections 51a of the locking portions 51R were to come in contact with an inner surface of the forward/rearward movement restriction grooves 34b (see FIG. 17) while elastically deforming, with the contacting portion with the corresponding lock grooves 28 as a base point, the amount of deformation thereof is not very much. Therefore, the load on the locking sections 51a of the locking portions 51R can be reduced.

The above-described present invention is not limited to the above-illustrated embodiment; various modifications are possible.

For example, a modified embodiment shown in FIGS. 18 through 21 can be implemented.

Figure 18:
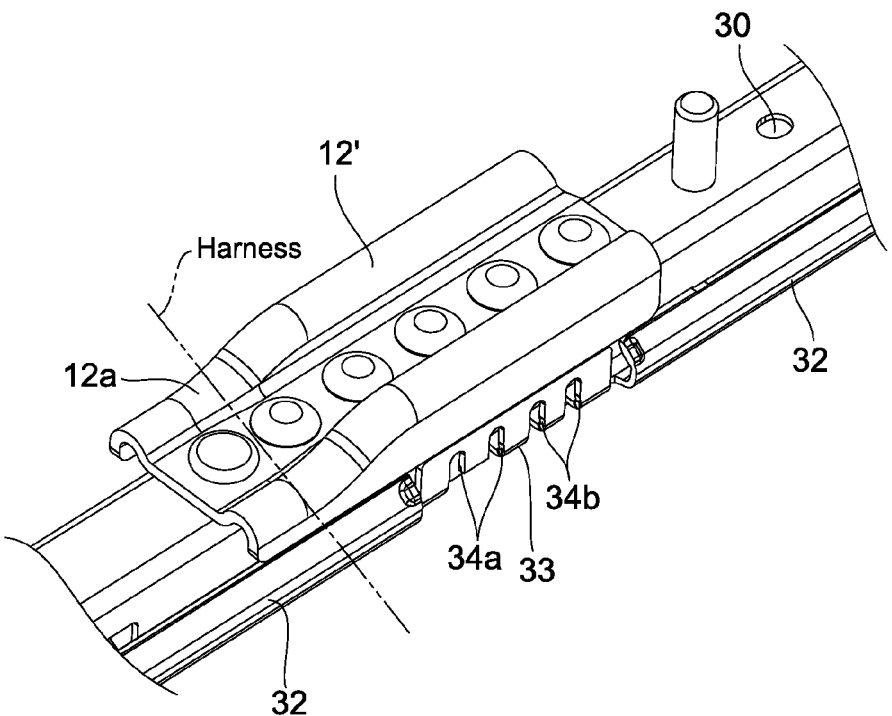
FIG. 18 is a perspective view of a central portion of a left rail unit of a first modified embodiment, as viewed from above.

In a first modified embodiment shown in FIG. 18, the shape of the metal upper reinforcement member 12', which is mounted on the upper surface of the left upper rail 30 (inner upper rail), has been changed from the above-described upper reinforcement member 12. Specifically, by recessing the front end portion of the upper reinforcement member 12', a front-end recess 12a is formed in the front end. When the upper reinforcement member 12', having such a shape, is mounted onto the left upper rail 30, since a clearance gap is formed between the left upper rail 30 (the front-end recess 12a of the upper reinforcement member 12') and the underside of the seat (seat cushion), it is possible to pass a harness through this clearance gap (e.g., a harness which is provided between a detector provided on a seatbelt anchor and a controller of the automobile, wherein detection signals generated by the detector are sent to the controller when the detector detects that a seatbelt has been connected to a lock device that is provided on the seatbelt anchor, which is provided on the seat cushion side).

Figure 19:
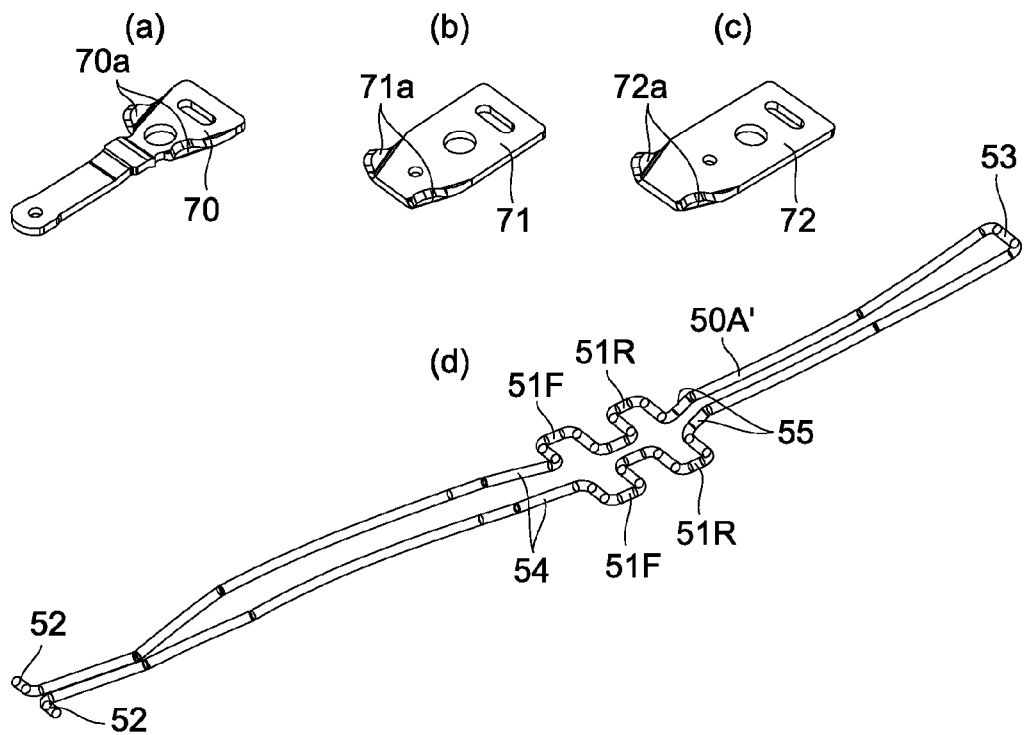
FIG. 19 is a part diagram of lower-rail stoppers and a lock spring according to a second modified embodiment.

In a second modified embodiment shown in FIG. 19, one of the lower rail stoppers 70, 71 and 72, shown in (a), (b) and (c), is mounted near the front end and near the rear end of the bottom wall 22 of the lower rail 21. The lower rail stoppers 70, 71 and 72 are provided with a pair of left and right stopper pieces 70a, 71a and 72a, respectively (the lower rail stoppers 70, 71 and 72 shown in FIG. 19 are for use near the rear ends of the bottom wall 22; the lower rail stoppers 70, 71 and 72 are inverted in the forward/rearward direction for use near the front ends of the bottom wall 22).

In the second modified embodiment, the upper rail 30 is slidable in the forward/rearward direction relative to the lower rail 21 between a front-end position, at which the left and right downward extensions 45c and 46c of the inner reinforcement members 45 and 46, mounted on the upper rail 30, contact the left and right stopper pieces 70a, 71a and 72a of the lower rail stoppers 70, 71 and 72 that are positioned at the front side, and a rear-end position, at which the left and right downward extensions 45c and 46c contact the left and right stopper pieces 70a, 71a and 72a of the lower rail stoppers 70, 71 and 72 that are positioned at the rear side.

Furthermore, in the second modified embodiment, a lock spring 50A' shown in (d) is used. Portions of the lock spring 50A' that are positioned immediately in front of the locking portions 51F constitute front-end bent portions 54 which bend obliquely upwards in the forward direction, and portions of the lock spring 50A' that are positioned immediately behind the locking portions 51R constitute rear-end bent portions 55 which bend obliquely upwards in the rearward direction. Hence, since the front-end bent portions 54 and the rear-end bent portions 55 are formed on the front and rear sides of the locking portions 51F and 51R, respectively (although not shown in the drawings, front-end bent portions 54 and rear-end bent portions 55 are formed on the front and rear sides of the locking portions 51R of the lock spring 50B, respectively), the region positioned further forward than the locking portions 51F and 51R (the locking portions 51R in the lock spring 50B) and the region positioned further rearward from the locking portions 51F and 51R (the locking portions 51R in the lock spring 50B) are positioned to be stepped upward from the locking portions 51F and 51R (the locking portions 51R in the lock spring 50B). Therefore, when the upper rail 30 slides relative to the lower rail 21 between the front-end position and the rear-end position, the lock spring 50A' (and the lock spring 50B) can be prevented from interfering with the lower rail stoppers 70, 71 and 72.

Figure 20:
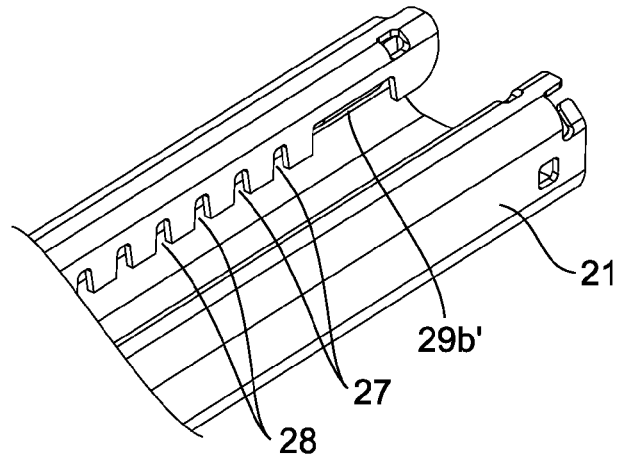
FIG. 20 is a perspective view of the rear-end portion of the lower rail, as viewed from above, according to a third modified embodiment.

In the third modified embodiment shown in FIG. 20, the forward/rearward widths of the front-end stoppers and the rear-end stoppers 29b' (the front-end stoppers not shown in the drawings) formed on the lower rail 21 have been widened, compared to those of the above-described embodiments. Accordingly, the possibility of the front-end stoppers and the rear-end stoppers 29b' breaking, due to the locking walls (stopper portions) 33 repeatedly colliding against the front-end stoppers and the rear-end stoppers 29b', can be reduced.

Figure 21:
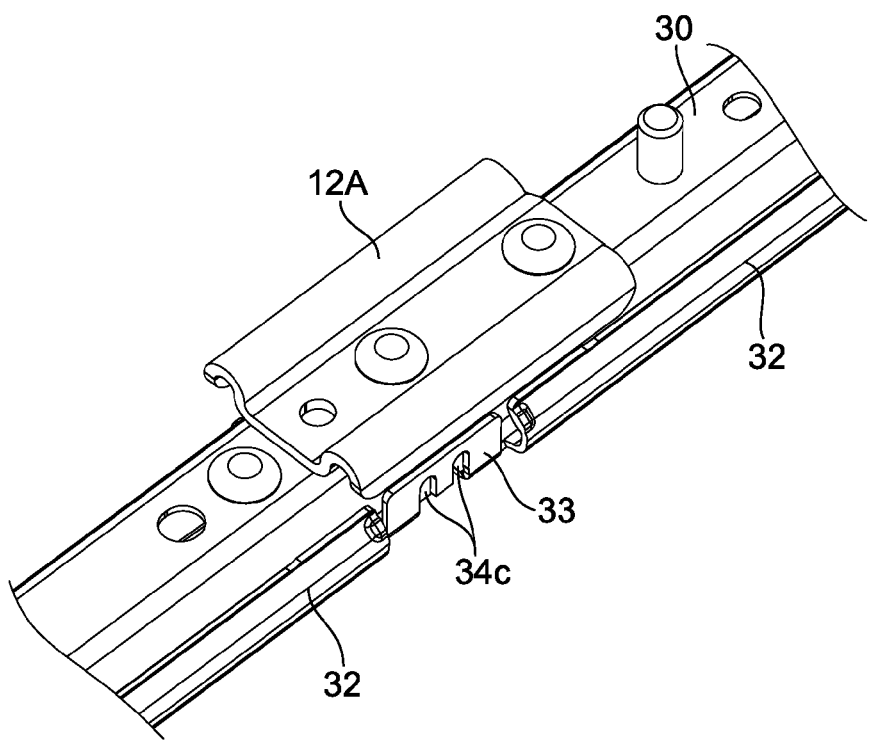
FIG. 21 is a perspective view a central portion of a right rail unit according to a fourth modified embodiment, as viewed from above.

In the fourth modified embodiment shown in FIG. 21, a metal upper reinforcement member 12A is mounted onto the upper surface of the right upper rail 30 (outer upper rail) with the forward/rearward position thereof aligned with that of the locking walls 33.

According to this modified embodiment, the rigidity of not only the left upper rail 30 (inner upper rail) but also the right upper rail 30 (outer upper rail) can be increased by the upper reinforcement member 12A.

Figure 22:
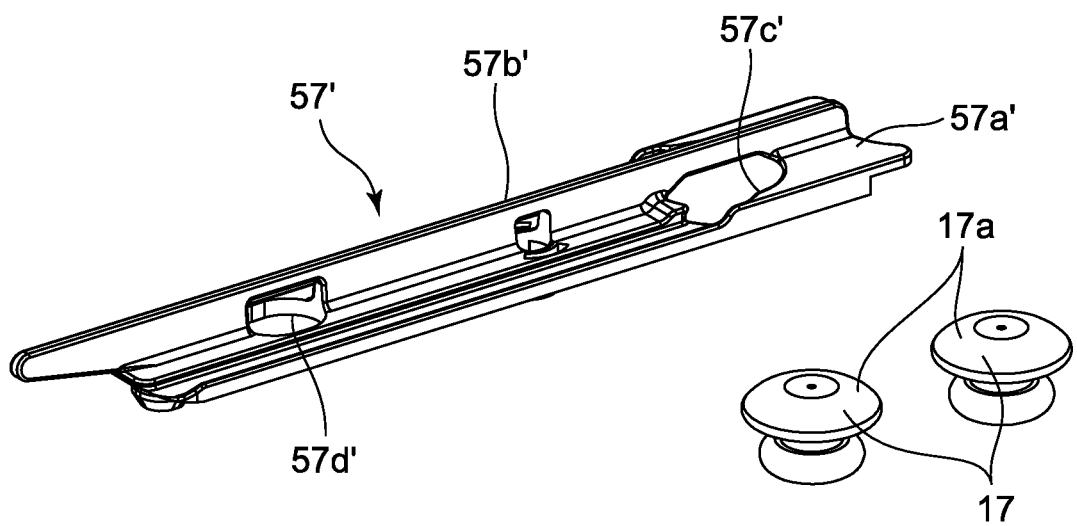
FIG. 22 is an enlarged perspective view similar to FIG. 12 of a fifth modified embodiment.

A foreign-object interference member 57' of the fifth modified embodiment shown in FIG. 22 is a synthetic-resin unitarily molded product, and is provided with a plate-portion 57a' and a partition portion 57b'. As shown in FIG. 22, the front end portion of the partition portion 57b' is positioned further forward than the front end portion of the plate-portion 57a. A rivet relief hole 57c', which is round in shape in a plan view, is formed in the vicinity of the rear end of the underside of the plate-portion 57a' and extends to the lower end portion of the partition portion 57b', and a rivet relief hole 57d', which is round in shape in a plan view, is formed in the vicinity of the front end of the underside of the plate-portion 57a' and extends to the lower end portion of the partition portion 57b'. Furthermore, a pushnut and a hook-shaped hooking portion (both are not shown) that are the same as the pushnut 57e and the hook-shaped hooking portion 57f are provided on the underside of the plate-portion 57a' and project downwards. The foreign-object interference member 57' can be mounted onto the bottom wall 22 via the same method as that of the foreign-object interference member 57 (the head 17a of the rivet 17 that is positioned at the front is positioned inside the rivet relief hole 57d', and the head 17a of the rivet 17 that is positioned at the rear is positioned inside the rivet relief hole 57c') and can exhibit the same effects as those of the foreign-object interference member 57.

Furthermore, a foreign-object interference member 57 or 57' can be mounted in a reversed forward/rearward orientation to that described above, onto the front end portion (the end portion that is upwardly exposed when the upper rail 30 is slid to the rear-end position) of the bottom wall 22 of the lower rail 21. In this case, when the upper rail 30 is slid to the rear end position, the rear end portion of the partition portion 57b/57b' is either positioned further rearward from the front end of the upper rail 30 or at the same forward/rearward position as that of the front end of the upper rail 30. Furthermore, the front end portion of the partition portion 57b/57b' is positioned further forward than the front-end stoppers 29a.

Furthermore, in the case where the foreign-object interference member 57/57' is mounted onto the rear end portion of the bottom wall 22, the rear end portion of the partition portion 57b/57b' can be positioned at the same forward/rearward position as that of the rear-end stoppers 29b or can extend until the rear end portion of the bottom wall 22. Similarly, in the case where the foreign-object interference member 57/57' is mounted onto the front end portion of the bottom wall 22, the front end portion of the partition portion 57b/57b' can be positioned at the same forward/rearward position as that of the front-end stoppers 29a or can extend until the front end portion of the bottom wall 22.

Furthermore, the forward/rearward distance between opposing surfaces of a pair of locking sections 51a composing part of each of the locking portions 51F can be shorter than the forward/rearward distance between opposing surfaces of a pair of locking sections 51a constituting each of the locking portions 51R (in this case, the lock spring 50B has a structure in which only one locking portion 51F is provided on each of the left and right side portions). In this case, the forward/rearward distance between the front surface of the front locking section 51a of each locking portion 51F and the front surface of the corresponding forward/rearward movement restriction groove, and the forward/rearward distance between the rear surface of the rear locking section 51a of each locking portions 51F and the rear surface of the corresponding forward/rearward movement restriction groove, are narrower than each of the forward/rearward distance between the rear surface of the front locking section of each locking portion 51F and the rear surface of the corresponding forward/rearward movement restriction groove, and the forward/rearward distance between the front surface of the rear locking section 51a of each locking portion 51F and the front surface of the corresponding forward/rearward movement restriction groove.

Furthermore, the number of locking portions provided on the left and right sides of the lock spring 50A(50A') can be three or more. However, also in such a case, the forward/rearward distance between the rear surface (51a7) and the front surface (51a9) of the front locking section (51a1) and the rear locking section (51a4), respectively, composing part of at least one locking portion (positioning locking-portion) is made shorter than the forward/rearward distance between the rear surface (51a15) and the front surface (51a11) of the front locking section (51a14) and the rear locking section (51a12), respectively, composing part of the other locking portions (spaced-apart locking portion), and furthermore, the forward/rearward width of the forward/rearward movement restriction grooves 34b, into which the positioning locking-portion fits, is made shorter than the forward/rearward width of the forward/rearward movement restriction grooves 34a, into which the spaced-apart locking portion fits.

Furthermore, the lock spring 50B can have the same configuration as that of the lock spring 50A(50A') and the corresponding locking walls 33 (forward/rearward movement restriction grooves) can have the same configuration as that of the locking walls 33 (forward/rearward movement restriction grooves) corresponding to the lock spring 50A (50A').

INDUSTRIAL APPLICABILITY

In the vehicle slide rail device according to the present invention, the locking portions do not easily break even if the locking/unlocking operation is repeatedly carried out by the lock release lever or a load is applied in the forward/rearward direction on the upper rails of the seat in a locked state, while having a structure that provides a lock spring having locking portions which are positioned within the forward/rearward restriction grooves of the upper rail and can enter into and escape from lock grooves of the lower rail.

REFERENCE SIGNS LIST

10 Slide rail device
12 Upper reinforcement member
12a Front-end recess
20 Rail unit
15 Mounting bracket
16, 17 Rivets
16a, 17a Rivet heads (mounting projections)
21 Lower rail
22 Bottom wall
22a Mount through-holes
23 Outer wall portion
24 Roof underside portion
25 Inner wall portion
26 Base-end supporting portion
27 Lock teeth (lock mechanism)
28 Lock grooves (lock mechanism)
29a Front-end stoppers (stopper projections)
29b Rear-end stoppers (stopper projections)
30 Upper rail
31 Base
32 Upright walls
33 Locking walls (stopper portions)
34a, 34b, 34c Forward/rearward movement restriction grooves
36 Lock-engaging lug
36a Spring lock-engaging grooves
37 Lock-engaging lug
40 Lock release lever
41 Side walls
42 Rotational contact protrusion
43 Spring pressing-piece
44 Spring-hook groove
45 Inner reinforcement member
45a Mounting portion
45b Side portions
45c Downward extensions
46 Inner reinforcement member
46a Mounting portion
46b Side portions
46c Downward extensions
50A, 50A' Lock spring
50B Lock spring
51F Locking portions (lock mechanism)
51R Locking portions (lock mechanism)
51a Locking sections
51b Connecting sections
52 Front-end locking lugs
53 Rear-end lock-engaging portion
54 Front-end bent portions
55 Rear-end bent portions
55 Retainers
56 Bearing balls
57, 57' Foreign-object interference member
57a, 57a' Plate-portion
57b, 57b' Partition portion
57c Rivet relief recess
57c' Rivet relief hole
57d, 57d' Rivet relief hole
57e Pushnut
57f Hooking portion
60 Loop handle
61 Operation portion
61a Downward-portions
62 Rear-end connecting portion
70, 71, 72 Lower rail stoppers
70a, 71a, 72a Stopper pieces
L1, L2 Lighter
P Contact portion

The invention claimed is:

1. A slide rail device of a vehicle, comprising:
a lower rail which extends in a forward-and-rearward direction and is provided with a large number of lock grooves, which are arranged in the forward-and-rearward direction, said lower rail being immovable relative to a floor of the vehicle;
an upper rail which is slidable in said forward-and-rearward direction relative to said lower rail and is provided with a plurality of forward-and-rearward movement restriction grooves which are arranged in the forward-and-rearward direction;
a lock spring, which is slidable together with said upper rail relative to said lower rail, provided with a locking portion which includes a pair of front and rear locking sections which are respective positioned within said forward-and-rearward movement restriction grooves and can selectively enter into, and escape from, said lock grooves; and a lock release lever, supported by said upper rail, which is rotatable between a locked position, at which said locking sections are allowed to engage with said lock grooves by a biasing force of said lock spring, and an unlocked position, at which said lock release lever presses said lock spring in a direction such that said locking sections escape from said lock grooves against said biasing force, wherein a rear surface of the front locking section and a front surface of the rear locking section, of said locking portion, contact inner surfaces of corresponding said lock grooves, respectively, wherein a distance between a front surface of the front locking section and a front surface of a first forward-and-rearward restriction movement groove of said forward-and-rearward movement restriction grooves is narrower than a distance between the rear surface of the front locking section and a rear surface of said first forward-and-rearward movement restriction groove, and wherein a distance between a rear surface of the rear locking section and a rear surface of a second forward-and-rearward movement restriction groove of said forward-and-rearward movement restriction grooves is narrower than a distance between the front surface of the rear locking section and a front surface of said second forward-and-rearward movement restriction groove.

2. The slide rail device of a vehicle according to claim 1, wherein said lock spring comprises a plurality of said locking portions, which are provided at different positions in the forward-and-rearward direction, wherein said locking portions include:

at least one positioning locking-portion, in which a rear portion of the front locking section thereof and a front portion of the rear locking section thereof both contact inner surfaces of corresponding said lock grooves, respectively, and at least one spaced-apart locking portion, in which a rear portion of the front locking section thereof and a front portion of the rear locking section thereof are both spaced apart from inner surfaces of corresponding said lock grooves, respectively, wherein a distance between a front surface of the front locking section of said positioning locking-portion and a front surface of a corresponding forward-and-rearward movement restriction groove is narrower than a distance between a front surface of a front locking section of said spaced-apart locking portion and a front surface of a corresponding forward-and-rearward movement restriction groove; and wherein a distance between a rear surface of the rear locking section of said positioning locking-portion and a rear surface of the corresponding forward-and-rearward movement restriction groove is narrower than a distance between a rear surface of the rear locking section of said spaced-apart locking portion and a rear surface of the corresponding forward-and-rearward movement restriction groove.

\* \* \* \* \*